United States Patent [19]

Chow et al.

[11] Patent Number: 5,376,701
[45] Date of Patent: Dec. 27, 1994

[54] THERMOPLASTIC POLYMER FIBRE COMPOSITION

[75] Inventors: Wai Y. Chow, Houston, Tex.; Michel Goguelin, Charavines, France

[73] Assignee: Exxon Chemical Patents Inc., Linden, N.J.

[21] Appl. No.: 910,079

[22] PCT Filed: Jan. 9, 1991

[86] PCT No.: PCT/EP91/00021
§ 371 Date: Sep. 3, 1992
§ 102(e) Date: Sep. 3, 1992

[87] PCT Pub. No.: WO91/10702
PCT Pub. Date: Jul. 25, 1991

[30] Foreign Application Priority Data

Jan. 15, 1990 [GB] United Kingdom ............... 9000865

[51] Int. Cl.$^5$ .................. C08K 9/06; C08K 3/40; C08L 51/06; B32B 17/04
[52] U.S. Cl. ............... 523/213; 428/391; 523/212; 523/214; 524/494; 524/504
[58] Field of Search ........... 523/212, 213, 214, 209; 524/454, 443, 494, 504

[56] References Cited

U.S. PATENT DOCUMENTS

| | | | |
|---|---|---|---|
| H1,021 | 2/1992 | Machado et al. | 524/494 |
| 3,661,628 | 5/1972 | Marsden | 428/429 |
| 3,755,245 | 8/1973 | Gloor | 523/213 |
| 3,936,415 | 2/1976 | Coakley | 523/206 |
| 4,394,414 | 7/1983 | Brown et al. | 523/208 |
| 4,426,469 | 1/1984 | Marzola et al. | 523/209 |
| 4,481,075 | 11/1984 | Dailly et al. | 162/145 |
| 4,550,131 | 10/1985 | Yats | 524/494 |
| 4,621,115 | 11/1986 | Morita et al. | 524/494 |
| 4,645,565 | 2/1987 | Vallee et al. | 162/123 |
| 4,663,369 | 5/1987 | Kawai et al. | 523/214 |
| 4,694,031 | 9/1987 | Morita et al. | 524/494 |
| 4,734,321 | 3/1988 | Radvan et al. | 428/283 |
| 5,008,306 | 4/1991 | Goguelin | 524/494 |
| 5,053,449 | 10/1991 | Biggs et al. | 523/214 |

FOREIGN PATENT DOCUMENTS

| | | | |
|---|---|---|---|
| 0278409 | 8/1988 | European Pat. Off. | 523/214 |
| 0322043 | 6/1989 | European Pat. Off. | 524/494 |
| 0333518 | 9/1989 | European Pat. Off. | 524/494 |
| 0266363 | 3/1989 | Germany | 524/494 |
| 53-110645 | 9/1978 | Japan . | |
| 0019347 | 2/1983 | Japan | 523/214 |
| 0145750 | 8/1983 | Japan | 523/214 |
| 58-145750 | 8/1983 | Japan . | |
| 0295940 | 12/1987 | Japan | 524/494 |
| 1174943 | 12/1969 | United Kingdom . | |
| 1378873 | 12/1974 | United Kingdom . | |

*Primary Examiner*—Peter Szekely
*Attorney, Agent, or Firm*—Douglas W. Miller; William G. Miller

[57] ABSTRACT

Compositions suitable for producing mineral fibre reinforced thermoplastic composite materials by the wet-laid process comprise mineral fibres, matrix polymer and a coupling agent. The fibres are silanized with reactive silane groups capable of reacting with the coupling agent, for example a maleic anhydride grafted polyolefin, to improve adhesion between the fibres and matrix polymer in the final composite product. The composition excludes components which hinder the reaction between the silane groups and the coupling agent.

34 Claims, No Drawings

THERMOPLASTIC POLYMER FIBRE COMPOSITION

The present invention essentially concerns a composition suitable for the preparation of a mineral fibre reinforced thermoplastic matrix polymer composite material, a composite material and a process for making same.

In the prior art, there is already known a surface treatment of glass fibres to improve adhesion with a polymeric matrix. Examples of this prior art are JP-A-57-038548 and JP-A-60-046951, which latter discloses a surface treatment of glass fibres by dipping them in an ammoniacal solution of a copolymer of maleic anhydride and vinylacetate or an ethylenic hydrocarbon of formula $CnH_{2n}$ with n being from 2 to 5, and a silane coupling agent to provide silanized glass fibres.

In the prior art, there are also known mineral fibre reinforced polyolefin matrix composite materials, comprising mineral fibres, a polyolefin matrix and process aids. Most of them are prepared by a dry process based on melt extrusion. According to the melt extrusion process, all the components are mixed together and extruded when the polymer component is molten to prepare the composition (see for instance JP-A-60-001236). The compositions are said to have excellent mechanical strength.

In the composition, the mineral fibres used, usually glass fibres, can be surface treated with a silane compound, such as an aminosilane.

Different processes are described in order to improve the adhesion between a polyolefinic matrix and a fibrous reinforcing material. Thus, GB-1,378,873 describes the use of a blend of an aromatic monocarboxylic acid or a carboxylic or polycarboxylic acid and a graft copolymer obtained by grafting an unsaturated dicarboxylic acid onto a propylene in a melt mixing and extrusion process of polypropylene and fiberglass.

U.S. Pat. No. 3,755,245 describes a composite obtained by injection moulding of a mixture of polypropylene, organic peroxide, a high molecular weight halogenated organic compound and aminosilane heated glass fibers.

Different processes are also described to prepare fiber glass with specific coatings intended to have improved adhesion with the polyolefinic matrix.

Thus, GB-A-1,174,943 describes inorganic fiber reinforced propylene polymer molding compositions wherein the fibers are coated with the reaction product of aminosilane with anhydride modified polyolefin.

U.S. Pat. No. 4,426,469 describes a specific coating of fiber glass with a three component coating comprising a polyolefinic film forming agent, a silane and a bis-maleamic acid, and the use of these glass fibers to prepare blends with polyolefinic compounds which are treated by injection molding.

U.S. Pat. No. 3,936,415 describes the preparation of glass fibers coated with a mixture of an organosilane coupling agent, an oxidized polyolefin and a carboxylated high molecular weight elastomer. These fibers are then dried and used for the production of reinforced polyolefinic matrix.

U.S. Pat. No. 3,661,628 describes another type of coated fiber glass and their use after being dried and mixed with olefinic polymers to form articles through molding and extrusion.

Other similar melt extrusion prior art compositions are disclosed in JP-A-53-110645, JP-A-58-145750.

Finally, GB-A-1,262,470 (=FR-1,598,204) discloses a surface treatment of inorganic surfaces to improve adhesion of organic coatings comprising a combination of an organosiloxane and of a copolymer of ethylene containing acid units. The disclosure of this document is very broad and the uses disclosed concern coating of any silicous product, such as glass, in the form of panels, pearls, fibres, and notably to provide safety window glass (see page 4, lines 19 to 29). The siloxane alone or a mixture of the siloxane and the ethylenic copolymer containing carboxylic acid groups are applied as a coating on the surface of the substrate (see page 4, lines 112 to 126). In the example given, the coating binder comprises the ethylenic copolymer containing acid functions dispersed in an aqueous solution, in which has been introduced gamma-aminopropyl-(triethoxy)-silane; and a strand of fibre glass is immersed in the aqueous solution (page 59, lines 95 to 121).

This patent only discloses and suggests a possible blend of glass fibres with an olefin type resin by injection molding and simple extrusion (page 4, lines 53 to 60; page 6, lines 24 to 35).

A fully different way to prepare mineral fibres reinforced thermoplastic matrix composite materials is by a wet-laid process, and there is no suggestion in this GB document of the use of such silanized glass fibres in such a wet-laid process.

The wet-laid process for producing fibre reinforced thermoplastic composites has been known for some years, and in general employs techniques commonly used in papermaking in the preliminary stages. Thus a mixture of reinforcing fibres, powdered thermoplastics materials and optionally dispersion aids, fillers, etc. is formed into a dilute slurry with water. The slurry is then passed to a papermaking type machine and delivered in a thin layer onto a moving mesh or "wire". The water is drained off through the wire to leave a thin web of thermoplastic particles in which are dispersed the reinforcing fibres. Because of the production method, the fibres, e.g. glass fibres, are arranged with their longitudinal axes in the plane of the web.

The web is dried, for example using hot air, at a temperature below that at which the polymer fuses and the dried web is then converted into a fused product by heating to a temperature at which the thermoplastic particles melt and hence fuse into a continuous polymer matrix. cooling and shaping, e.g. by pressing into a mould whilst the polymer is still molten result in a fibre-reinforced thermoplastic polymer composite material of generally good physical/mechanical properties. When such product is in the form of a flat two-dimensional sheet, it may be moulded into three-dimensional articles by flow moulding (hot-pressing) technique.

Teachings relating to the wet-laid process may be found for example in U.S. Pat. No. 4,481,075, U.S. Pat. No. 4,645,565 and similar methods which also employ papermaking technology may be found for example in U.S. Pat. No. 4,734,321.

It has long been recognized in the art that teachings relating to production of melt extrusion compositions cannot be extrapolated to formulate compositions for a wet-laid process in view of the different technical problems encountered in dispersing the composition components in an aqueous slurry. More particularly, the art of promoting fibre to polymer adhesion in a fused (continuous polymer phase) fibre reinforced composite (final product) which is produced by a dry melt extrusion process cannot be applied to a wet-laid process.

Final products prepared via the wet-laid process have many advantages over products obtained via the dry melt extrusion process. Thus, the reinforcing fibres in the mineral fibres reinforced polyolefin matrix composite often are subject to breakage when the composite is prepared by energy intensive methods such as extrusion and melt mixing. Although interfacial adhesion of fibres to polymer can increase mechanical properties, such fibre breakage always lead to mechanical properties far less than expected, because fibre length is decreased during the production process. In contrast, the wet-laid process allows the fibre to maintain its integrity but interfacial adhesion of polymer to fibre is not achieved (resulting in mechanical properties also less than expected) because of the problems caused by the presence of water in the aqueous slurry used to lay down the composition.

So, there exists a performance need to achieve adhesion between fibres and the polymer matrix and to simultaneously retain fibre integrity. The prior art solutions have to be improved as regards the adhesion/adhesion rate between the inorganic material (mineral fibre) and the thermoplastic (especially polyolefinic) matrix in the final composite material, as regards the length of inorganic material, with the purpose of improving the mechanical properties of the composite materials, of simplifying the method of preparation of improving the manufacturing rate.

A main purpose of the present invention is to solve the technical problem of improving sharply the adhesion between mineral fibres reinforcing a thermoplastic matrix in fused composite materials.

A further main object of the present invention is to solve the technical problem of improving adhesion between mineral fibres and a thermoplastic, for example oleofinic, matrix in composite material, while allowing use of long mineral fibres, preferably having a length ranging between 6 and 50 millimeters and most preferably between 10 and 25 millimeters.

Another main object of the present invention is to solve the above technical problem of improving the adhesion between mineral fibres and a thermoplastic matrix in composite materials, whilst further allowing incorporation of large amounts of mineral fibres.

Yet another object of the present invention is to solve the technical problem of improving mechanical properties, notably impact strength, tensile and flexural strength, preferably improving the CHARPY impact strength up to 50%, the tensile and flexural strength by a value ranging between 30 and 40%, in composite materials.

All these objects of the present invention may be solved simultaneously for the first time by using a wet-laid process, which is very simple and low cost, thereby being applicable on the industrial scale.

Therefore, according to a first aspect, the present invention provides a composition suitable for the preparation, by a wet-laid process, of a mineral fibre reinforced thermoplastic matrix polymer composite material having improved adhesion between the mineral fibres and the matrix polymer, comprising mineral fibres, thermoplastic polymer and optionally process aids, characterized in that said mineral fibres are silanized mineral fibres containing reactive silane groups, and in that said composition further comprises an adhesion-promoting coupling agent capable of reacting with the reactive silane groups, to improve adhesion between the mineral fibres and the polymer; said composition not containing components which would hinder significantly the reaction between the coupling agent and the reactive silane groups under the processing conditions of the wet-laid process.

The thermoplastic polymer of the defined composition may be any thermoplastic which finds industrial use, for example polyolefins, polyamides or polyesters. Particularly preferred are the polyolefins such as polypropylene, and hereinafter the invention is described in terms of its applicability to polyolefins although it is to be understood that the particular embodiments described apply equally to other organic thermoplastic polymers.

According to a specific embodiment, the composition is characterized in that it is contained in a slurry, said composition being dispersed in the slurry, preferably at a content of from 0.1 to 5% by weight, e.g. about 0.5% by weight, said slurry being preferably an aqueous slurry.

Preferably, the coupling agent is a polyolefin modified with unsaturated carboxylic acid or anhydride groups, preferably having a content from 0.2 to 5% by weight of grafted acid or anhydride groups, and most preferably from 0.5 to 2% of grafted acid or anhydride groups. These acid or anhydride groups, which are grafted, are preferably derived from maleic, himic anhydride or acrylic acid.

According to a further embodiment, the composition is characterized in that the coupling agent preferably has a molecular weight ranging between 5,000 and 250,000, depending on the nature of the thermoplastic polymer, e.g. polyolefin, used to provide the matrix.

According to a special embodiment, the invention relates to a composition wherein the content of the mineral fibres ranges between 15 and 60 weight %; preferably between 20 and 50 weight % with regard to the total weight of mineral fibres and thermoplastic polymer, e.g. polyolefin, the high mineral fibre content providing unexpected good mechanical properties. The mineral fibres are preferably glass fibres, and according to another aspect of the invention, the mineral fibres are long mineral fibres, preferably of a length ranging between 6 and 50 mm, most preferably between 10 and 25 mm. These are of course much longer than the fibres which are typically present in melt extruded composites. The mineral fibres may have a diameter of for example from 8 to 20, preferably from 10 and 17 micrometers.

According to another invention embodiment, the composition is characterized in that the mineral fibres have been silanized with a silane surface coating selected from an aminosilane surface coating and a polysiloxane surface coating, which preferably represents less than about 1% by weight of the total weight of the mineral fibres. Preferably, the mineral fibres e.g. glass fibres, are also treated with an ionic species which functions to reduce agglomeration of the fibres in aqueous slurry. Such treatment with ionic species may take place before or after the fibres are silanized. The total of ionic and silanized components on the mineral fibre is preferably no more than 1% by weight of the treated fibres. The ionic species which may be used to treat the fibres may be for example, an amphoteric or a cationic surfactant such as dialkyl dimethyl ammonium salts or alkylbetaines, these being partially linked to the fibre in the treatment.

The proportion of coupling agent in the inventive composition preferably ranges between 0.5 and 25 weight %, preferably between 1 and 15 weight %, with regard to the total weight of the mineral fibres, the thermoplastic polymer, e.g. polyolefin and the coupling agent.

According to another embodiment of the invention, the composition is characterized in that it further comprises a dispersant for promoting dispersion of mineral fibres in water preferably in a content ranging between 0.05 and 15 weight %, more preferably 1 to 10 weight %, based on the total weight of the mineral fibres. The dispersant will of course be compatible with the coupling agent, in the sense that it does not hinder significantly the reaction between the coupling agent and the reactive silane groups on the mineral fibres. Preferably, the dispersant is an ionically charged polymer, not containing functional groups, such as amino or hydroxy groups, which would de-activate the coupling agent, or not containing acid groups which would preferentially react with silanized mineral fibres. Such a dispersant is, for example, an aliphatic ester amide.

According to a further embodiment of the invention, the composition is characterized in that the thermoplastic polymer which, in the final product, constitutes the matrix of the composite material, is in powder form having preferably a grain size of from 100 to 1000, more preferably 300 to 800 micrometers.

In the composition of the invention, the thermoplastic polymer powder may be optionally partially replaced with a polyolefin pulp, i.e. a fibrillated polyolefin. This may be present, for example, in an amount of from 0 to 10 weight %, e.g. 1 to 20 weight %, more preferably 2 to 10 weight % based on the total of fibres, thermoplastic polymer, coupling agent and pulp.

Further, the invention concerns a composition characterized in that it further comprises a flocculant, preferably in a content ranging between 0.5 and 2 weight %, based on the total dry content of the composition; and/or an anti-oxidant, preferably in a content ranging between 1 and 2 weight % based on the total dry content of the composition.

It is a feature of the inventive compositions, and of the processes in which they may be used in order to reach the target fused matrix reinforced composites, that they do not contain components, e.g. process aids, which would hinder the reaction between the reactive silane groups on the mineral fibres and the coupling agent. Hindrance of the reaction is here intended to include preferential reactions when the thermoplastic polymer is melted, and prior reactions which would "kill" the reactive species in the silanizing groups and the coupling agent.

The composition according to the invention may be in the form of a mixture, e.g. in an aqueous slurry, or in the form of a dried web of polymer particles, coupling agent and silanized mineral fibres which will be permeable to air. The advantageous effect of the improved adhesion between thermoplastic polymer component and fibre component will only be seen, though, when the web has been converted to a solid composite material wherein the thermoplastic is fused into a continuous matrix in intimate contact with the fibres. Such conversion includes the step of heating the composition to a temperature at least equal to the melting point of the thermoplastic matrix polymer.

Furthermore, the invention relates to a wet-laid process for preparing a mineral fibre reinforced polyolefin matrix composite material, which includes forming a drained web from an aqueous slurry, characterized in that the aqueous slurry is prepared with a composition as above defined, preferably said composition constituting from 0.1 to 5 weight % of the slurry. Preferably, the web is heated to a temperature sufficient to melt the polyolefin and shaped to obtain a shaped composite material.

Further aims, objects, purposes and advantages of the invention will appear from the illustrative examples given herebelow. In the examples, all the percentages are given by weight unless otherwise stated.

COMPARATIVE EXAMPLE 1

Composite Material from a Polypropylene Matrix, Commercially Available Glass Fibres Having Ionic Surfactant Species (Diameter of 10 Microns, a Length of 13 mm), and a Cationic Dispersant, by a Wet-Laid Method In 7 liters of water containing 3 g of a cationic dispersant based on fatty acid (Cartaspers ® DS1 of Sandoz), 30 g of glass fibres which is sized to have good dispersion in aqueous medium (reference HW618 supplied by OWENS CORNING FIBERGLAS EUROPE) having an average length of 13 mm and 10 microns diameter, are added with strong stirring. 6 g of synthetic pulp are then introduced with moderate stirring. After suitable dispersion 64 g of polypropylene powder, of mean particle size 700 microns are added. After dilution until the suspension contains about 5 g of solids per liter, the mixture forming a "slurry" is then admitted on a wire screen, dewatered then dried according to the conventional papermaking technique. A sheet of 700 g/m$^2$ is thus obtained which comprises sufficient cohesion to be handled, stored, transported and in which the various components of the formulation have been perfectly retained.

To make a final industrial product from this sheet, about 7 of such sheets may for example be superposed and, after having effected preheating up to a temperature of the order of 180° C. to 210° C., the assembly may be moulded under pressures of 0,4-1 MPa (40-1CO kg/cm$^2$) for a cycle less than 30 seconds.

COMPARATIVE EXAMPLE 2

Composite Material Made from the Same Composition as Example 1, but with Silanized Glass Fibres This example differs from the preceding one in that the glass fibres are 10 microns diameter, 13 mm long and are sized with a silane to promote adhesion as well as dispersion in aqueous medium (reference EC 690/2 by Vetrotex).

COMPARATIVE EXAMPLE 3

Composite Material from the Same Composition as in Example 1, but with 6% of Coupling Agent This example differs from example 1 in that 6 g of an unsaturated carboxylic acid modified polyolefin having 0.4% of grafted carboxylic acid chains from maleic acid origin (reference Exxelor ® 2011 by Exxon Chemical) is added into the aqueous solution and the amount of polypropylene is reduced to 58 g.

INVENTION EXAMPLE 4

Composition Material from the Same Composition as in Example 2, but with 6% of Coupling Agent of Example 3

This example differs from example 2 in that 6 g of Exxelor ® 2011 is added into the aqueous solution and the amount of polypropylene is reduced to 58 g.

It has to be noted that the dispersant used in examples 1, 2, 3 and 4 are all "friendly" to adhesion.

INVENTION EXAMPLE 5

Same Composition as in Example 4, but with Additional Flocculant

This example differs from example 4 in that 1 g of flocculant (reference X8494 by Dow Chemical) is added into the aqueous solution.

INVENTION EXAMPLE 6

Composite Material from a Composition as in Example 4, but with Use of Inert Carbon Black This example differs from example 4 in that the PP granules is filled with 1 g of carbon black. The black PP granules can be produced by first melt mixing white PP granules with carbon black masterbatch (reference P30PPH by Cabot) followed by grinding.

COMPARATIVE EXAMPLE 7

Composite Material from a Composition as in Example 5, but with Use of a Dispersant Containing Hydroxy Functional Groups This examples differs from example 5 in that 2 g of carbon black dispersed in water at 0.35% slurry concentration (containing a dispersant with hydroxy functional groups) (reference Tincolor BS by GMC) is added into the aqueous solution.

COMPARATIVE EXAMPLES 8, 9

Influence of Glass Fibres Content

These examples differ from example 1 in that 20 g and 40 g of glass fibres are used respectively and the amounts of polypropylene are adjusted accordingly to 68 g and 48 g.

INVENTION EXAMPLES 10, 11 and 12

Influence of Variation of Glass Fibres and Polypropylene Content

These examples differ from example 4 in that 20 g, 40 g and 50 g of glass fibres are used respectively and the amounts of polypropylene are adjusted accordingly to 68 g, 48 g and 38 g.

INVENTION EXAMPLES 13, 14 and 15

Influence of the Length of Glass Fibres

These examples differ from example 10, 4 and 11 in that the glass fibres are 25 mm long, 10 microns in diameter, and are sized similarly to EC 690/2 (reference R16EX20 by OWENS CORNING FIBERGLAS EUROPE).

INVENTION EXAMPLES 16, 17 and 18

Influence of Glass Fibres on Adhesion

These examples differ from examples 10, 4 and 11 in that the glass fibres are 16 microns diameter, 13 mm long, and are sized similarly to EC 690/2 (reference R16EX25 supplied by OWENS CORNING FIBERGLAS EUROPE).

All the composite materials obtained from the above examples 1 to 18 are submitted to measure of the mechanical properties, comprising measure of the Flexural Modulus according to DIN 53457; flexural strength according to DIN 53452, tensile strength according to DIN 53455 and unnotched CHARPY impact strength according to DIN 53453.

All the results obtained are set forth in the table given herebelow.

|  | EXAMPLES | | | | | | | | |
|---|---|---|---|---|---|---|---|---|---|
|  | 1 | 2 | 3 | 4 | 5 | 6 | 7 | 8 | 9 |
| Fibres | | | | | | | | | |
| HW618 | 30 |  | 30 |  |  |  |  | 20 | 40 |
| EC690/2 |  | 30 |  | 30 | 30 | 30 | 30 |  |  |
| R16EX25 | | | | | | | | | |
| R16EX20 | | | | | | | | | |
| PP | 64 | 64 | 58 | 58 | 58 | 58 | 58 | 68 | 48 |
| Pulp | 6 | 6 | 6 | 6 | 6 | 6 | 6 | 6 | 6 |
| Coupling Agent | 0 | 0 | 6 | 6 | 6 | 6 | 6 | 6 | 6 |
| Dispersant+ | 10 | 10 | 10 | 10 | 10 | 10 | 10 | 10 | 10 |
| Flocculant* |  |  |  |  | 1 |  |  |  |  |
| Carbon Black* |  |  |  |  |  | 1 |  |  |  |
| Dis. Carb. Black* |  |  |  |  |  |  | 1 |  |  |
| Flex Modulus | 4500 | 4600 | 4700 | 4700 | 5003 | 5500 | 4200 | 3084 | 5600 |
| Flex Strength | 125 | 130 | 126 | 165 | 170 | 150 | 126 | 84 | 127 |
| Tens Strength | 83 | 90 | 88 | 108 | 98 | 98 | 82 | 51 | 88 |
| CHARPY Impact | 40 | 60 | 48 | 60 | 60 | 53 | 40 | 35 | 55 |

|  | EXAMPLES | | | | | | | | |
|---|---|---|---|---|---|---|---|---|---|
|  | 10 | 11 | 12 | 13 | 14 | 15 | 16 | 17 | 18 |
| Fibres | | | | | | | | | |
| HW618 | | | | | | | | | |
| EC690/2 | 20 | 40 | 50 | | | | | | |
| R16EX25 | | | | 20 | 30 | 40 | | | |
| R16EX20 | | | | | | | 20 | 30 | 40 |
| PP | 68 | 48 | 38 | 68 | 58 | 48 | 68 | 58 | 48 |
| Pulp | 6 | 6 | 6 | 6 | 6 | 6 | 6 | 6 | 6 |
| Coupling Agent | 6 | 6 | 6 | 6 | 6 | 6 | 6 | 6 | 6 |

-continued

| | | | | | | | | | |
|---|---|---|---|---|---|---|---|---|---|
| Dispersant+ | 10 | 10 | 10 | 10 | 10 | 10 | 10 | 10 | 10 |
| Flocculant* | | | | | | | | | |
| Carbon Black* | | | | | | | | | |
| Dis. Carb. Black* | | | | | | | | | |
| Flex Modulus | 3568 | 6291 | 7504 | 3740 | 4546 | 5493 | 3957 | 5301 | 6494 |
| Flex Strength | 124 | 169 | 199 | 122 | 168 | 185 | 113 | 170 | 172 |
| Tens Strength | 77 | 122 | 158 | 73 | 108 | 122 | 56 | 97 | 105 |
| CHARPY Impact | 35 | 69 | 80 | 45 | 62 | 84 | 40 | 68 | 74 |

+% on FG content
*% on total dry content
Test methods used to measure flexural modulus, flexural strength, tensile strength and unnotched Charpy strength are DIN 53457, DIN 35452, DIN 53455 and DIN 53453 respectively.

The data set forth in the attached table are used to illustrate:

a) comparative example 1 versus comparative example 2 shows that silanization of Fiber Glass (FG) alone cannot increase properties. The impact strength was increased, but no simultaneous improvement in strength;

b) comparative example 3 versus comparative example 1 shows that coupling agent alone cannot increase properties;

c) invention example 4 versus comparative examples, 1, 2 and 3 shows that the combined effect of silanization of FG and coupling agent is the only way to achieve increase of both impact and strength properties. The dispersant used in comparative examples 1, 2, 3 and 4 are all "friendly" to adhesion;

d) invention example 5 versus invention example 4 shows that the particular flocculant used in invention example 5 is again "friendly" to adhesion;

e) example 6 versus example 4 shows that inert carbon black is also "friendly" to adhesion;

f) comparative example 7 versus examples 4, 5 and 6 shows that although the flocculant and the carbon black are "friendly" to adhesion, the presence of a very "unfriendly" dispersant in the carbon black completely kills the adhesion. The dispersant used contains hydroxy functional groups;

g) comparative examples 8, 1, and 9 show that without adhesion, impact and strength properties enhancement due to increase of fibre glass content starts to level off at 40% FG level (compare examples 1 and 9);

h) invention examples 10, 4, 11, and 12 show that with adhesion, all the mechanical properties continue to increase with increase of glass fibre content even up to 50% level;

i) invention examples 13, 14, and 15 show that 10 microns, 25 mm long fibre glass with sizing similar to the EC 690/2 when mixed with coupling agent (Exxelor ®) can yield composites with very high properties via adhesion;

j) invention examples 16, 17, and 18 show that thicker (16 microns versus 10 microns) fibre glass with sizing similar to the EC 690/2 when mixed with coupling agent (Exxelor ®) can also yield composites with very high properties via adhesion.

The conditions of drying of the web in the wet-laid process ensure chemical reaction between the coupling agent and the reactive silane groups. An optimal complementary chemical reaction may occur when the thermoplastic polymer is molten.

We claim:

1. A composition comprising:
    a) mineral fibres said fibres having a length in the range of from about 6 to about 50 millimeters, said mineral fibres being silanized with a coating having reactive silane groups, said mineral fibres also being treated with a surfactant;
    b) a coupling agent, said coupling agent including a polyolefin containing a grafted group, said grafted group being selected from the group consisting of an unsaturated carboxylic acid and an unsaturated anhydride; and
    c) a thermoplastic polymer.

2. The composition of claim 1, characterized in that said composition is in the form of a slurry, said composition being dispersed in the slurry at a content in the range of from about 0.1 to about 5 percent by weight of the total weight of the slurry.

3. The composition of claim 1, wherein said grafted groups are present in the range of from about 0.2 to about 5 percent by weight of said grafted groups based on the total weight of the coupling agent.

4. A composition according to claim 1 characterized in that the content of the mineral fibres ranges between about 15 and about 60 weight percent based on the total weight of said mineral fibres and thermoplastic polymer.

5. The composition of claim 1 characterized in that the mineral fibres have a diameter ranging between about 8 and about 20 micrometers.

6. The composition of claim 1 characterized in that the mineral fibres have been silanized with a silane surface coating selected from a group consisting of an aminosilane and a polysiloxane, said silane surface coating being present at less than about 1 percent by weight of the total weight of the mineral fibres.

7. The composition of claim 1 characterized in that the mineral fibres are glass fibres.

8. The composition of claim 1 characterized in that the content of said coupling agent ranges between about 0.5 and about 25 weight percent based on the total weight of the mineral fibres, the thermoplastic polymer and the coupling agent.

9. The composition of claim 1 characterized in that the surfactant is selected from the group consisting of an amphoteric and a cationic surfactant.

10. The composition of claim 1 characterized in that said composition further comprises a dispersant present in a range between about 0.05 and about 15 weight percent based on the total weight of the mineral fibres; wherein said dispersant is substantially free from groups selected from the group consisting of amino, hydroxy and acid groups.

11. The composition of claim 10, characterized in that the dispersant is an aliphatic ester amide.

12. The composition of claim 1 characterized in that the thermoplastic polymer is a powder, said powder having a grain size in the range of from about 100 to about 1000 micrometers.

13. The composition of claim 1 characterized in that said composition further comprises a polyolefin pulp present in the range of from about 1 to about 20 weight percent based on the total weight of said fibres, said thermoplastic polymer, said coupling agent and said pulp.

14. The composition of claim 13, characterized in that said composition further comprises a flocculant, said flocculant being present in a range between about 0.5 and about 2 weight percent, based on the total dry content of the composition.

15. The composition of claim 14, characterized in that said composition is in the form of an air-permeable web.

16. The composition of claim 1 characterized in that the thermoplastic polymer comprises a polyolefin.

17. The composition of claim 16, characterized in that the polyolefin comprises polypropylene.

18. A mineral fibre reinforced thermoplastic polymer material in which the polymer comprises a continuous fused matrix, characterized in that said mineral fibre reinforced thermoplastic polymer has been prepared from the composition of claim 17 by a process which includes the step of heating the composition to a temperature of at least the melting temperature of the thermoplastic polymer.

19. The composition of claim 4 characterized in that the mineral fibres have a diameter ranging between about 10 and about 17 micrometers.

20. The composition of claim 7 characterized in that the content of the coupling agent ranges between about 1 and about 15 weight percent based on the total weight of the mineral fibres, the thermoplastic polymer, and the coupling agent.

21. The composition of claim 11 wherein the thermoplastic polymer of the composite material is in a powder form, having a grain size in the range of from about 300 to about 800 micrometers.

22. The composition of claim 12 characterized in that said composition further comprises a polyolefin pulp of a weight content in the range of from 2 to 10 percent based on the total weight of said fibres, said thermoplastic polymer, said coupling agent and said pulp.

23. A composition comprising a slurry of:
a) a thermoplastic polymer;
b) silanized mineral fibres having a coating containing reactive silane groups;
c) a polyolefin coupling agent, said coupling agent containing grafted groups selected from the group consisting of unsaturated carboxylic acid and unsaturated anhydride; and
said silanized mineral fibres having been treated with a surfactant, said mineral fibres having a length in the range of from about 10 to about 25 millimeters.

24. A composition comprising an aqueous slurry, said slurry containing in the range of from about 0.5 to about 5 percent by weight of the combination of:
a) a polypropylene polymer;
b) a coupling agent comprising polyolefin containing grafted unsaturated carboxylic acid groups, said polyolefin having a content in the range of from about 0.2 percent of about 5 percent by weight of said grafted acid groups;
c) silanized mineral fibres characterized in that said silanized mineral fibres have been treated with a surfactant and said fibres have a length in the range of between about 10 and about 25 millimeters, said silanized mineral fibres further characterized in that the total of the silane or polysiloxane coating is about 1 percent by weight or less based on the total weight of the mineral fibres;
said composition characterized in that the coupling agent ranges between about 1 and about 15 weight percent with regard to the total weight of the mineral fibres, the coupling agent, and the polypropylene polymer.

25. In a process comprising:
a) forming a slurry;
b) forming a drained web; and
c) drying the web;
the improvement comprising forming the slurry according to claim 2.

26. A process of using the composition of claim 1 comprising the steps of:
a) forming a slurry according to claim 2;
b) forming a web from the slurry; and
c) drying the web at a temperature below that at which the polymer fuses.

27. The process according to claim 26 wherein said coupling agent is polypropylene containing grafted functionality in the range of from about 0.2 to about 5 percent by weight of a group selected from groups consisting of an unsaturated carboxylic acid or and an unsaturated anhydride wherein said thermoplastic polymer is polypropylene.

28. The process according to claim 26, wherein the slurry of step a) additionally comprises a dispersant wherein said dispersant is selected from the group consisting of an amphoteric surfactant and a cationic surfactant said dispersant being substantially free from groups selected from the group consisting of amino, hydroxy, and acid groups.

29. The process according to claim 26 additionally comprising the step of d) heating the web of step c) to a temperature of at least the melting point of the thermoplastic matrix polymer.

30. The process according to claim 29 additionally comprising the step of e) molding the heated web formed in step d) by subjecting it to pressures in the range of from about 0.4 to about 1 MPa (40 to 100 kg/cm) to obtain a shaped composite material.

31. The process according to claim 30 wherein said shaped composite material comprises a two dimensional sheet.

32. The composition of claim 1 characterized in that said surfactant is selected from the group consisting of dialkyldimethyl ammonium salts and alkylbetaines.

33. In a process comprising the steps of:
a) forming a slurry, said slurry containing;
1) mineral fibres said fibres having a length in the range of from about 6 to about 50 millimeters, said mineral fibres being silanized with a coatings having reactive silane groups, said mineral fibres being treated with a surfactant;
2) a thermoplastic polymer;
b) drying said slurry; the improvement comprising adding a coupling agent to said slurry, said coupling agent including a polyolefin containing a grafted group, said grafted group being selected from the group consisting of an unsaturated carboxylic acid and an unsaturated anhydride.

34. A process for forming an air permeable web comprising the steps of:
a) mixing in an aqueous slurry
1) glass fibres said fibres having a length in the range of from about 6 to about 50 millimeters, said glass fibres being silanized with a coatings having reactive silane groups, said glass fibres also being treated with a surfactant;
2) a thermoplastic polymer; and
3) a coupling agent, said coupling agent including a polyolefin containing a grafted group, said grafted group being selected from the group consisting of an unsaturated carboxylic acid and an unsaturated anhydride;

b) draining said slurry to form a web; and
c) heating said web.

* * * * *